(12) United States Patent
Borenstein et al.

(10) Patent No.: US 9,430,474 B2
(45) Date of Patent: Aug. 30, 2016

(54) AUTOMATED MULTIMEDIA CONTENT RECOGNITION

(71) Applicant: Microsoft Corporation, Redmond, WA (US)

(72) Inventors: Eran Borenstein, Oakland, CA (US); Achiezer Brandt, San Mateo, CA (US); Eitan Sharon, San Mateo, CA (US); Mehmet Tek, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 14/156,333

(22) Filed: Jan. 15, 2014

(65) Prior Publication Data

US 2015/0199351 A1   Jul. 16, 2015

(51) Int. Cl.
*G06F 17/30* (2006.01)
(52) U.S. Cl.
CPC ... *G06F 17/30023* (2013.01); *G06F 17/30784* (2013.01)
(58) Field of Classification Search
CPC ............ G06F 17/30743; G06F 17/30784; G06F 17/30781; G06F 17/30964; G06F 17/30023
USPC ................................................. 707/708, 740
See application file for complete search history.

(56) References Cited

U.S. PATENT DOCUMENTS

| | | | |
|---|---|---|---|
| 8,300,884 B2 | 10/2012 | Sharma | |
| 8,655,878 B1 * | 2/2014 | Kulkarni | G06F 17/30424 707/736 |
| 2006/0195860 A1 | 8/2006 | Eldering et al. | |
| 2009/0157391 A1 | 6/2009 | Bilobrov | |
| 2010/0318515 A1 | 12/2010 | Ramanathan et al. | |
| 2012/0008821 A1 | 1/2012 | Sharon et al. | |
| 2012/0296458 A1 | 11/2012 | Koishida et al. | |
| 2013/0054645 A1 * | 2/2013 | Bhagavathy | G06K 9/00744 707/780 |
| 2013/0083003 A1 | 4/2013 | Perez et al. | |
| 2013/0246457 A1 * | 9/2013 | Stojancic | G06F 17/30023 707/769 |

(Continued)

FOREIGN PATENT DOCUMENTS

| | | |
|---|---|---|
| EP | 1653381 A2 | 5/2006 |
| WO | WO2014/004914 A1 | 1/2014 |

OTHER PUBLICATIONS

Lee, Sunil, et al., "Robust Video Fingerprinting for Content-Based Video Identification," IEEE Transactions on Circuits and Systems for Video Technology, vol. 18, No. 7, Jul. 2008, 6 pages.

Andrushia, Diana, et al., "Content Based Fingerprinting for Video Copyright Detection System," International Journal of Emerging Technology and Advanced Engineering, vol. 2, Issue 8, Aug. 2012, 5 pages.

(Continued)

*Primary Examiner* — Debbie Le
(74) *Attorney, Agent, or Firm* — Aaron Chatterjee; Kate Drakos; Micky Minhas

(57) ABSTRACT

An automated content recognition system accurately and reliably generates content identification information for multimedia content without accessing the multimedia content or a reliable source of the multimedia content. The system receives content-based queries having fingerprints of multimedia content. The system compares the individual queries to one another to match queries and thereby form query clusters that correspond to the same multimedia content. The system aggregates identification information from the queries in a cluster to generate reliable content identification information from otherwise unreliable identification information.

20 Claims, 6 Drawing Sheets

(56) References Cited

U.S. PATENT DOCUMENTS

2013/0326573 A1    12/2013  Sharon et al.
2014/0280304 A1*   9/2014   Scherf .............. G06G 17/30743
                                                          707/769

OTHER PUBLICATIONS

International Search Report & The Written Opinion of the International Searching Authority dated Mar. 25, 2015, International Application No. PCT/US2015/010545.

* cited by examiner

AUTOMATED MULTIMEDIA CONTENT RECOGNITION

BACKGROUND

The disclosed technology is related to media identification.

The identification of media content, such as video, audio, and slideshows, is a significant task. The amount of original multimedia content being produced continues to increase while costs for storage and dissemination continue to decease. Moreover, the growth and accessibility of cable, satellite, and Internet distribution channels has increased dramatically in recent years. While attempts to produce metadata and other textual information to describe available media content have provided some success in identifying and retrieving content, current solutions are often ineffective.

Some search methods and systems are directed to identifying and retrieving content based on key words found in an associated file names, tags on associated webpages, text of hyperlinks pointing to the content, etc. Such search methods rely on Boolean operators indicative of the presence or absence of search terms. However, such search terms tend not to fully represent the content being searched, leading to poor performance when searching content such as video or audio.

Additionally, new multimedia content is generated and published every day. While mechanisms to search and identify new content is sometimes provided, such as by the attachment of metadata or other descriptions to the content source, this data is not always available or accurate. Moreover, access to multimedia content is not always available. Accordingly, identifying the multimedia content through traditional means, may not be possible or effective.

SUMMARY

Systems and methods for identifying multimedia content including video, audio, slideshows and the like are provided. An automated content recognition system is able to accurately and reliably generate content identification information for multimedia content without accessing the multimedia content or information from a reliable source of the multimedia content. The system receives content-based queries having fingerprints of multimedia content. The system compares the individual queries to one another to match queries and thereby form and synchronize query clusters that correspond to the same multimedia content. The system aggregates identification information from the queries in a cluster to generate reliable content identification information from otherwise unreliable identification information.

A multimedia content identification system receives queries including fingerprints of multimedia content. The platform analyzes the fingerprints from queries associated with multiple different client devices. Based on similarity or matching between fingerprints, the individual queries are grouped into query clusters. The system identifies queries having fingerprints for the same content and generates query clusters for similar queries. One or more representative queries from a query cluster are compared against a base set of known fingerprints. If the representative query matches a known fingerprint, content identification information associated with the known fingerprint is used to generate a reply to each query in the cluster. If the representative query does not match a known fingerprint, the system analyzes each query in the cluster for any available textual data such as metadata associated with the fingerprint or content. The textual data is analyzed to determine if there is consensus among the textual data of the different queries in the cluster. If there is consensus, the system generates a reply to each query in the cluster with content identification information based on the consensus textual data. The system further updates the base set of known signatures with one or more representative fingerprints and the content identification information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
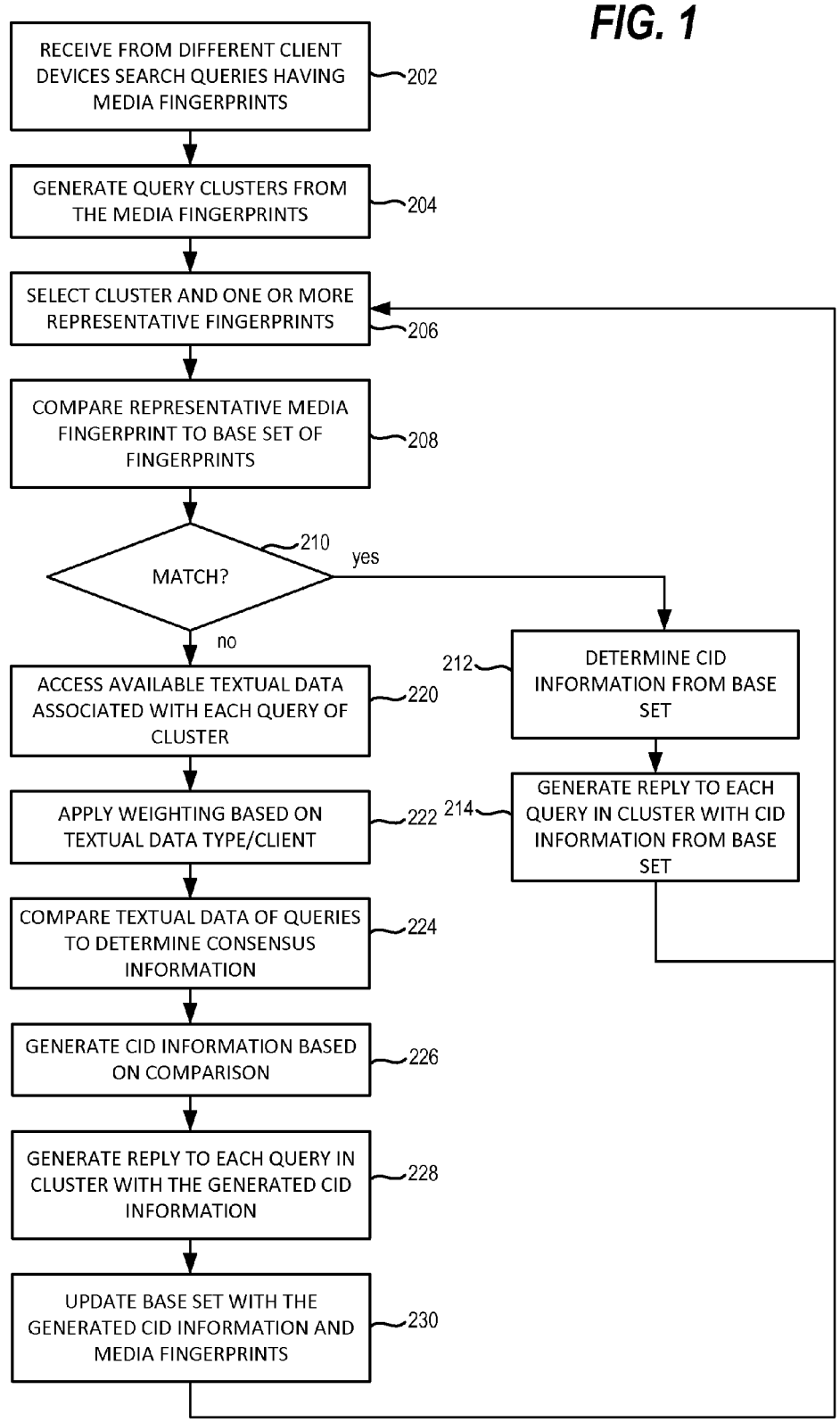
FIG. 1 is a flowchart describing a process of automated multimedia content recognition in accordance with an embodiment.

Multimedia content may include, but is not limited to, audio content, video content, and/or slide show content comprising one or more still images. Media-based queries request the identification of content based on the content itself rather than textual data associated with the content. For example, media-based queries may include queries for the identification of video such as television shows, commercials, movies, etc. Similarly, queries may include queries for the identification of audio, such as songs, talk shows, etc. The queries may include the multimedia content or fingerprints representing the multimedia content. Traditionally, to service media-based queries that request an identification of specific media content based on content rather than text associated with the content, systems require one or more reliable sources of the multimedia or information such as metadata concerning the multimedia. The systems can preprocess the multimedia content and generate a search index based on fingerprints of the content for example.

Systems and methods for automated multimedia content recognition are described. The system generates content identification information automatically for content, such as newly released content, for which the system has no existing content identification information. The system generates content identification information without access to the underlying source content. In this manner, the system may generate a corpus or base set of multimedia content identification information based on media fingerprints without access to a reliable source of the actual content.

In one embodiment, an automated multimedia content recognition system is provided that can identify multimedia content without access to a reliable source of the multimedia content. The system receives queries with media fingerprints from multiple client devices. The system clusters the queries based on visual or audio matching, for example, of the query fingerprints. The query clusters are used to generate reliable content identification information such as metadata for the multimedia content. In this manner, the content may be identified without access to any source of the content, such as a reliable source providing the content or metadata for the content. In one example, a minimum number of queries in a cluster may be established to ensure that reliable information can be extracted and deduced.

In an embodiment, the system generates multimedia content identification (CID) information based on fingerprints of the multimedia content. The system receives queries for the identification of multimedia content from multiple client devices. Each query includes one or more fingerprints associated with the multimedia content. The system compares the fingerprints of the different queries to determine relatedness amongst the fingerprints. The system generates query clusters including multiple queries that have one or more related fingerprints. For example, the system may cluster queries having a threshold number of matching fingerprints. One or more reference queries from each cluster are compared to a base set of known signatures. If a match is found between the reference query from a cluster, the content identification associated with the known signature(s) from the base set is used to generate a reply to each query in the cluster. The content identification information identifies the content in the media-based query and includes a timestamp for the content.

If the system does not find a match in the base set, the system accesses any available textual data received from each of the queries. The system compares the available textual data, such as metadata or description information for example, to determine if there is any identifiable consensus between the textual data of the queries in the cluster. If there is an identifiable consensus, the system generates a reply to each query in the cluster with the content identification information determined from comparing the textual data. The system also updates the base set of known signatures to include the reference query from the cluster and the content identification information. In this manner, the system may identify and generate a base set or corpus of known multimedia signatures automatically and without access to the source multimedia content. The system may track client sources to determine those that provide reliable textual data in one example. Fingerprints may be streamed from one or more reliable client devices for the automatic update of the corpus.

FIG. 1 is a flowchart describing a method of processing media-based queries in accordance with one embodiment to automatically generate content identification information. At step 202, the system receives queries from a plurality of different clients. Each query includes one or more media fingerprints. For example, the system may receive queries for the identification of video content that include one or more visual fingerprints of the source video content. The system may additionally or alternately receive queries for identifying audio content using audio fingerprints or queries for identifying slide show content using visual fingerprints. Moreover, audio fingerprints may be used in addition to or in place of visual fingerprints for the identification of video or slide show content.

At step 204, the system generates query clusters from the received queries. Step 204 may be performed periodically to group or otherwise associate related queries received during the specified time period. The system generates each query cluster to include multiple queries received during the time period. The query clusters are generated based on the relatedness of one or more fingerprints of each query. The system compares the fingerprints of each query to determine if any queries have matching fingerprints. The system may require a threshold number of matching fingerprints between queries to determine that the queries are related and thereby create a cluster for the queries. In one example, the system may establish a threshold number of queries that must contain matching fingerprints before generating a cluster for the queries.

Any number and type of media fingerprints may be used in accordance with embodiments. For example, visual fingerprints may include representations of a brightness correlation between areas of a frame of video. Visual fingerprints in a query may include a fingerprint for every frame of a video segment or a subset of frames. Audio fingerprints may include averaged-spectrogram images in one example. Audio fingerprints may be used alone for audio content or in combination with visual fingerprints to identify video content. Fingerprints may also or alternately be received for objects or faces in video content, for example, in a query to identify an actor or a product in a video segment. For more details regarding fingerprints, matching, and identification, see U.S. patent application Ser. No. 13/666,735, entitled "Video Identification and Search," filed Nov. 1, 2012, which is incorporated by reference herein in its entirety.

At step 206, the system selects a cluster and one or more representative fingerprints from the cluster. The representative fingerprints may be chosen at random or by selecting fingerprints that are determined to provide a higher level of discrimination from other fingerprints. At step 208, the system compares the representative fingerprints) of the cluster against a base set of known multimedia fingerprints. The system attempts to match the representative fingerprint against one or more fingerprints in the base set. At step 210, the system determines whether the representative fingerprint matches a fingerprint from the base set of signatures. If the representative fingerprint matches a base set signature, the content identification information for the base set signature is determined at step 212. At step 214, the system generates a reply to each query from the query cluster using the content identification information from the base set.

As the aforementioned steps illustrate, generating query clusters prior to comparing the query fingerprint may generate efficiencies by decreasing the number of queries and fingerprints that have to be compared against the base set to satisfy a group of queries. By clustering, a single fingerprint can be used to identify content identification information for a cluster of a large number of individual queries, saving the time and overhead associated with comparing each query against the base set of signatures.

If the system determines that the representative fingerprint for a query cluster does not match any known signatures from the base set, it accesses any available textual data associated with each query of the cluster at step 220. The textual data associated with a query may be included as a description of the content or metadata associated with the content for example. Textual data may include file name, title, cast, production, format, encoding, production date, etc. that may be included in a video source for example. Similar information may be included for audio sources. For example, some queries may include metadata identifying what a client device or application determines to be content that is the subject of the query. For example, a set top box or other television interface may include guide data as textual data for an associated query. This textual data may represent an attempt by the client device to identify content based on some source of information other than a visual identification. Accordingly, the client device may nevertheless issue a query that is received at step 202 to identify the content for the client device based on visual identification. For example, in some instances a set top box may associate incorrect textual data with content it is displaying.

Guide data or other information used to determine the video content may be incorrect or incorrectly interpreted. By way of specific example, some television interfaces such as set top boxes or other multimedia consoles are used to control other set top boxes such as cable or satellite receivers Infrared signals (as well as other wired and wireless remote control methods) may be used by the multimedia console to control the cable or satellite receiver. The multimedia console may issue media-based queries that are received at step 202. In some instances, the multimedia console may include textual data such as metadata or title and description information as part of the queries. Because the multimedia console controls the set top box, its textual data may not always be correct. In other instances, a client device such as a portable device may capture video or audio such as by recording the output of a display or speaker. The portable device may attempt to provide a visual or audio identification of the content. Additionally, the device may issue a query to the system containing textual data based on its identification as well as a fingerprint for identification by the system. The system may access any available textual data associated with any of the queries of the cluster.

At step 222, the system may optionally applying weighting values to the textual data for individual queries. For example, the system may weigh the textual data associated with a query based on the source of the query and/or the source of the textual data. The system may track users or clients and establish a rating of the reliability of textual data received with past queries from the users. The system may then weigh the textual data from some users more highly as being more reliable than the textual data from other more lower-rated users. Similarly, the system may weight some textual data such as metadata in a query higher than other textual data, such as textual data from the title of a video source, for example.

At step 224, the system compares the textual data of each query in the cluster to determine consensus information between the textual information. The system determines whether there is any consensus amongst the textual information. Step 224 can include comparing any of the available textual information, including metadata associated with the query and/or title or other descriptive information included with the query. Any weightings generated at step 222 can be applied when comparing the textual data to provide preference for certain textual information. For example, metadata may be weighted more heavily than other more loosely correlated textual information. The system may apply various thresholds to determine whether a consensus has been reached. For example, the system may determine whether a plurality or a majority of signatures in the query cluster include the same or similar textual information. Any number or percentage of matching queries within a cluster may be used. For example, the system may further group the queries within a cluster to determine groups having matching textual information. The system may determine which group includes the largest number of queries and select the textual information from that group.

At step 226, the system generates content identification information for the query cluster based on the textual analysis at step 224. In one embodiment, the system selects the content identification information based on the consensus information from step 224. For example, the system may select the matching or similar textual information from a group of queries in the cluster.

At step 228, the system generates a reply to each query in the cluster using the content identification information generated for the query cluster at step 226. Step 228 includes an identification of the content for the corresponding query based on the consensus of textual information amongst the queries of the cluster of matching fingerprints. In this manner, the system identifies matching fingerprints in queries to determine that the queries relate to the same content. The system then determines textual information based on information included in one or more queries of the cluster. That textual information is then returned as content identification information in response to each query of the cluster. In this manner, the system uses visual or other media-based fingerprints to identify matching content within queries. The system then generates content identification information for each query in the cluster. The content identification information may be generated without accessing a reliable source of multimedia content. Accordingly, with access only to a media signatures, a subset of which contain some textual information, identification of multimedia content can be made based on matching fingerprints. The consensus helps also aggregate new information coming from multiple sources. For example if client A and B agree on a content id for the content but each is bringing additional information about the content, the additional information can be used to inform client B of the information coming from client A and vice versa. When consensus is not certain or confidence is low the system may try to confirm and enhance the confidence by trying to search and identify the content in static archives like websites or video providers.

At step 230, the system updates the base set of known signatures for the query cluster. Step 230 may include storing one or more representative signatures from the query cluster along with the content identification information generated at step 226. As such, subsequent queries for the same content may be satisfied based on the base set of known signatures.

It is illustrated that the system may continuously provide automated updates to a base set of known signatures with content identification information, also referred to as a corpus or catalog of known or ground truth signatures. As new video content is published every day, the system may generate content identification information for the video content without accessing the content itself. As client queries for the identification of content are received, the system may utilize query clusters to identify content identification information based on matching media fingerprints between queries. In this manner, an automated update to the base set or corpus is provided, all without access to the underlying media content or a reliable source of the multimedia content. The continuous update and clustering can provide metadata enhancement as well as continuous learning of viewership patterns. These patterns can be useful in recommendation systems.

Additionally, query clusters can be updated over time. As more queries are received that match a query cluster, the metadata or other information in the newly received query may be added to the query cluster information. For example, metadata or other information can be updated in a base set of signatures. By way of specific example, a query cluster may be generated in response to queries related to a live event. Metadata and other information in the queries may be associated with the query cluster. Later, the metadata, may be updated with metadata or other information based on queries received after the live event.

Based on query clustering, the system is capable of identifying full or partial copies of multimedia content, including content that is live or recently broadcasted. The system may identify commercials embedded into television shows or broadcasts. The system may identify soundtracks or other audio content of music in television shows or movies. The system may be used to identify shortened version of video content such as video segments or clips of movies and television shows. Additionally, the system may identify different copies or sources of the same video content. This may include identification of content with added sub-titles or that is transcoded into different broadcast formats. In one example, the system reports content titles as well as a content timestamp within content to enable enhanced multimedia experiences. For example, television shows may be augmented by the system to include additional deals. Timely metadata may be provided for live or recently broadcasted content. Snapshots or short clips from content may be shared. Additionally using facial or object recognition based on fingerprints enables the identification of faces or objects in content. Moreover, users may be able to share snapshots or other material from the moment or otherwise based on the time of identified multimedia content.

Figure 2:
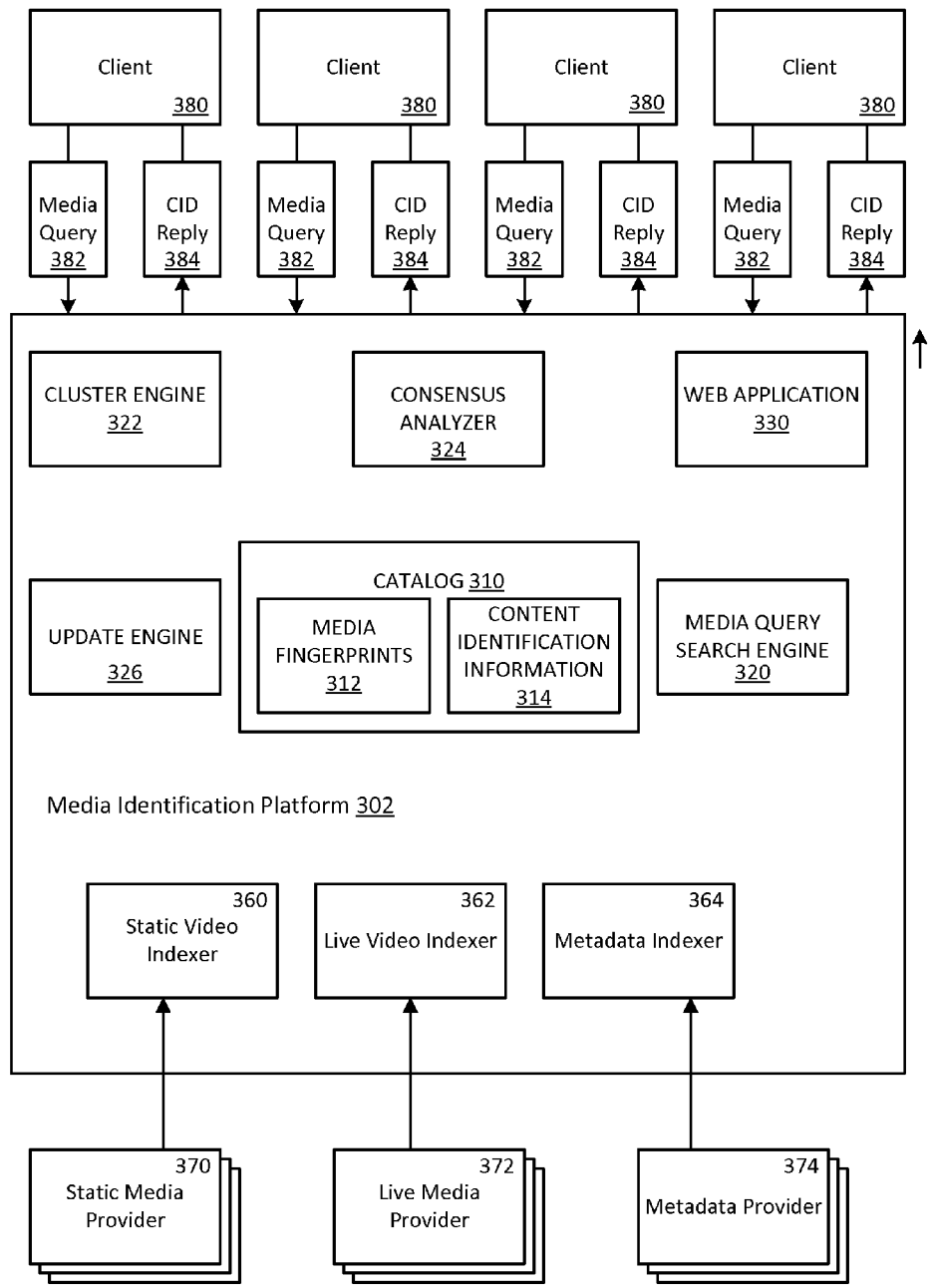
FIG. 2 is high level block diagram depicting a system for automated multimedia content recognition in accordance with an embodiment.

FIG. 2 is a block diagram depicting a system for automated content recognition according to one embodiment. In FIG. 2, one or more client devices 380, video identification platform 302, and multiple static video source providers 370, live video source providers 372, and metadata source providers 374 are in communication over one or more networks. Any number of video source providers, clients devices and platforms may be included in various embodiments. The servers, client devices and other components of the system may communicate using any combination of local area networks, wide area networks (WAN), the Internet, and/or any other network. Platform 302 clusters queries based on media fingerprints in the queries and textual data associated with at least a subset of the queries to generate content identification information for catalog 310 and to respond to the queries.

Client devices 380 may generally include any type of device such as a personal computer, multimedia console, workstation, mainframe, server, tablet, PDA, cell phone, or other processor-based computing device. The client devices may be mobile devices or non-mobile devices. Mobile devices include cellular telephones, palmtops, pocket computers, personal digital assistants, personal organizers, personal computers (PCs), and the like. Embodiments can be used with any number of computer systems, such as desktop computers, other hand-held devices, laptop or notebook computer systems, multiprocessor systems, micro-processor based or programmable consumer electronics, network PCs, mini computers, main frame computers and the like. Reference to client devices is made hereinafter by example but it will be understood to include reference to computing devices in general except where noted.

Catalog 310 stores content identification information 314 based on fingerprints 312 of the underlying content. In this manner, catalog 310 provides a visual (video or image) or/and audio-based identification of the underlying content. Combining audio and visual can resolve many ambiguities like static frame or silence. The identification is based on an analysis of the underlying content, rather than metadata provided with a video source for example. In one example, catalog 310 includes a base set of known media signatures and content identification information for the known signatures. The base set of known media signatures may include content identification information generated from multimedia sources providing pre-identified content, as well as content identification information generated by clustering queries and analyzing textual data when a reliable multimedia source is not available for identification of the content.

Catalog 310 may maintain content identification information based on pre-processing of some multimedia sources, for example of pre-identified content providers. For example, static media indexer 360 and live media indexer 362 may receive media sources from static media provider 370 and live media provider 372, and generate visual information from each video source, including a visual fingerprint of one or more frames in the video. The indexers can also extract any available textual data from the video, for example, information relating to title, cast, production, format, encoding, etc. that may be included in the video source file. In one embodiment, the video indexers also create an audio fingerprint for one or more frames of the video source. Metadata indexer 364 receives metadata sources from the metadata source providers 374. Metadata indexer 364 stores each metadata source in catalog 310 and optionally performs analysis and processing to generate additional information. In one embodiment, the system does not include any pre-processed content and generates content identification information for storage in catalog 310 based on clustering.

In addition to pre-processed content, catalog 310 maintains content identification information for content for which the platform has no pre-determined identification information. For example, platform 302 may interface with set-top boxes or portable devices that issue media queries 382 for the identification of newly published content, such as a live television show, live music release, etc. Platform 302 may return content identification replies 384 in response to these queries even where no pre-determined identification of the content is available to the platform. Moreover, the platform may generate new entries for catalog 310, including media fingerprints and content identification information based on fingerprint matching and consensus-based textual information among queries.

Web application 330 receives media queries 382 from the various client devices 380. Each media query includes at least one media fingerprint based on an analysis of the underlying content corresponding to the query. For example, a media query may be for the identification of a video segment, such as a television show, movie, etc. The query may include a single fingerprint or multiple fingerprints. For example, the query may include a series of fingerprints for every frame of a video segment. The query may include fingerprints for a subset of frames from a video segment. Clustering engine 322 accesses the queries 382 to perform clustering based on an analysis of the media fingerprints in each query. Clustering engine 322 analyzes the media fingerprints by comparing each fingerprint received in a query 382. The fingerprints are analyzed to determine matching between fingerprints of different queries. If two or more queries contain a matching fingerprint in one example, a query cluster is generated for the matching queries. Other numbers of queries with at least one matching fingerprint may be used in various implementations. Moreover, one or more matching fingerprints may be required in various implementations for concluding that two queries match.

In one example, a visual fingerprint represents a division of a video frame (image) into a number (e.g., 64) of equal size (e.g., 8×8) rectangular ordered cells. For each cell, the fingerprint includes two ordered bits. A first bit (horizontal bit) stores a first value (e.g., 1) if the right half of the cell is brighter than the left, and a second value (e.g., 0) if it is darker than the left. A second bit ("vertical bit") stores the first value if the upper half of the cell is brighter than the lower half, and the second value if it is darker than the lower half. Thus, the fingerprint is an ordered list of a number (e.g., 128) of bits per frame, coming from the number of ordered cells, creating an ordered bit representation of brightness.

Similar and other related signatures can be employed. One simple example includes dividing the active screen to larger 6×6=36 equal size rectangular cells, then producing a larger signature of, for example, say 196 bits (rather than the 128 described above) by way of comparing many different pairs of cells with respect to which is brighter than the other and producing the respective bits (similar to what is explained above for the 128-bit signature).

The cluster engine compares each fingerprint to one another to determine matching queries for the cluster. For example, random bit sets and collections of bit sets can be used for comparison, although any suitable fingerprint matching techniques may be used. For instance, a particular fingerprint may be selected and the remaining fingerprints designated as the base set of fingerprints for comparison. The base set can be divided into fingerprint buckets. Random bit keys of the selected fingerprint can be checked against the buckets and this process repeated until a matching fingerprint is found or the process is exhausted with no match. Multiple buckets or subsets can be probed with the same random bit key to improve efficiency. A threshold number of bits (e.g., 9 out of a 10-bit key) may be used to determine a candidate for fingerprint match for an area. Once a matching fingerprint is found, the system may select another fingerprint and establish the base set again as the remaining fingerprints. The process is repeated until all fingerprint matches within the set of queries is determined.

After cluster engine 322 generates a query cluster, search engine 320 compares one or more representative fingerprints from the cluster to the catalog of known fingerprints 312. The search or cluster engine may select one or more fingerprints at random as the representative fingerprint in one example. In another example, the cluster engine selects a representative fingerprint based on determining that the representative fingerprint is more discriminatory than other fingerprints in the cluster. Various techniques may be used for analyzing representative fingerprints against a base set of known signatures.

If the search engine 320 finds a matching fingerprint in the catalog, the web application 330 generates a reply to each query in the cluster with the content identification information 314 from the catalog. If the search engine does not find a matching fingerprint in the catalog, the query cluster is passed to the consensus analyzer 324.

The consensus analyzer first extracts any available textual information from each query in the cluster. The textual information may include metadata information submitted with some of the queries or other textual information such as a title of the video source file or other textual information loosely associated with the content. The analyzer 324 then compares the textual information from those queries including textual information to determine if there is similarity between the textual information of at least two queries in the cluster. Analyzer 324 may create groups within a cluster in one example where queries in a cluster contain different textual information.

The analyzer may also apply weighting to the textual data in one example. The source of the textual data, such as whether it is metadata or more loosely attached title information for example, may be considered to apply a weighting. Additionally, the source of the query, such as a client or user id associated with the query may be used to apply a weighting based on previous experience and performance of each client. The analyzer uses all the available textual information to determine if there is sufficient consensus among the textual information to generate a content identification for the cluster. A threshold number or percentage of queries having matching or similar textual data may be used in one example. The analyzer 324 generates content identification information for the cluster based on the consensus information. For example, the engine may generate the CID information to include the textual information of a group of queries in the cluster having matching textual information. The results of comparing the textual information and applying any weightings are used to generate the CID information in one example. In one example, platform 302 may determine additional information for the CID information than that included in the actual queries of the cluster. For example, the platform may search for additional CID information based on some of the text data of the queries to supplement that included in the queries themselves.

After generating content identification information for the cluster, the web application 330 generates a CID reply 384 for each query in the cluster including the generated CID information. Accordingly, the platform 302 provides CID information for queries based on visual or other matching between queries when the platform does not contain predetermined identification information for a media fingerprint. In this manner, the platform 302 generates CID information based on visual or other matching techniques of fingerprints between queries received from different client devices. This allows crowd-sourced data to be used for accurate and reliable identification of multimedia content.

Update engine 326 generates one or more entries in catalog 310 for the newly identified media content. The update engine 326 may add one or more representative fingerprints from the query cluster to the catalog along with the generated CID information. Subsequent queries can be matched to these representative fingerprints to generate CID information for the subsequent queries.

Although specific components and software modules are depicted, it will be apparent that numerous physical and software based configurations may be employed while remaining within the spirit of the present disclosure. Generally, software and program modules, managers and engines as described herein include routines, programs, components, data structures, and other types of structures that perform particular tasks or implement particular abstract data types. Hardware or combinations of hardware and software can be substituted for software modules as described herein.

Figure 3:
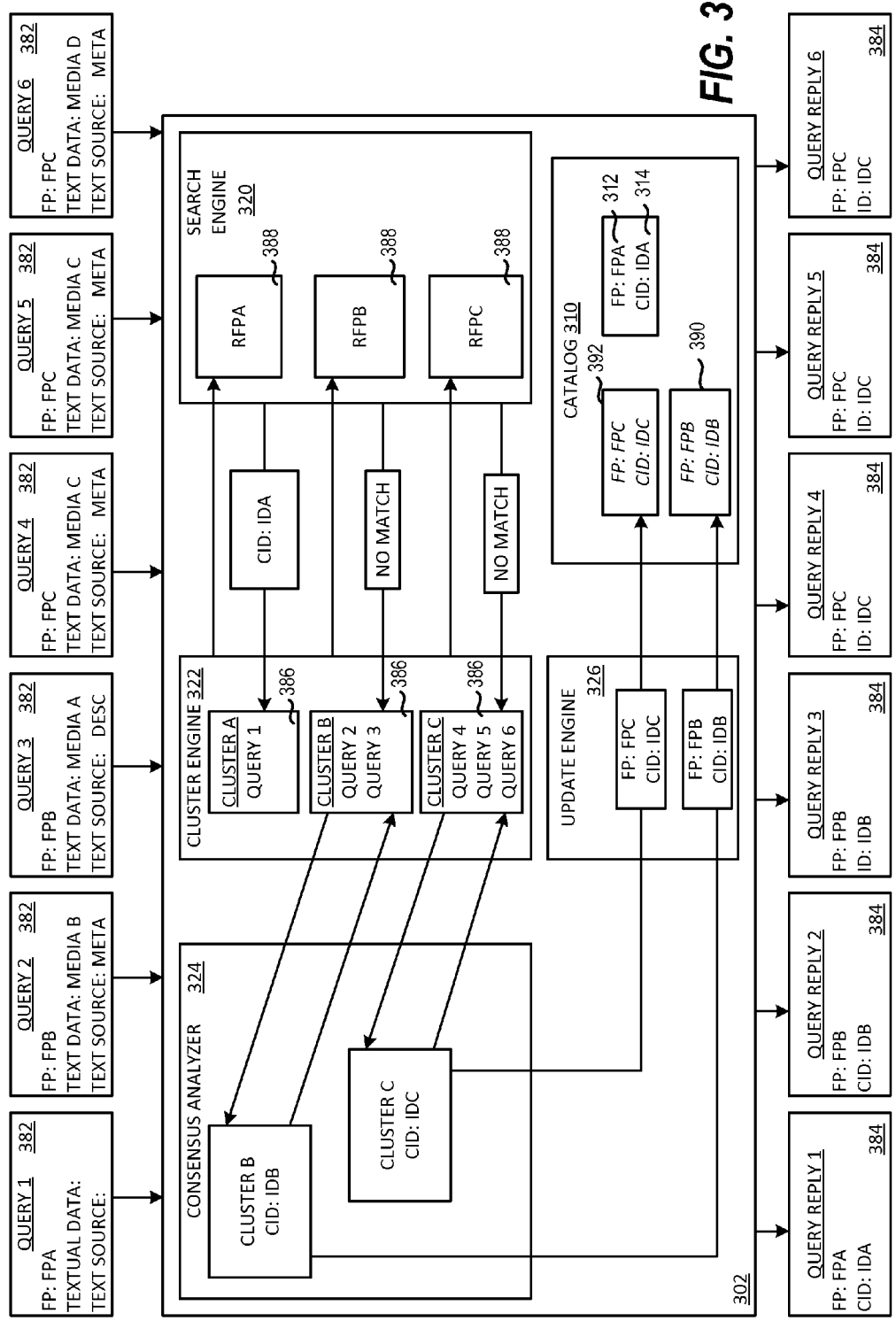
FIG. 3 is a high level block diagram depicting an example of query clustering in accordance with an embodiment.

FIG. 3 is a block diagram describing an example of operation of the media identification platform 302. In this example, platform 302 receives six individual media queries 382, such as visual-based queries that request identification of video content. Query 1 includes a media fingerprint FPA. Query 1 does not include any textual data such as metadata that identifies the query or the fingerprint included in the query. Query 2 includes a media fingerprint FPB. Query 2 also includes textual data that identifies the video content as Media B. Moreover, it is noted in FIG. 3 that the textual data originates from metadata associated with the video content from which the fingerprint originated. For example, Query 2 may be received from a set top box that provides metadata for visual queries that originate for content controlled or associated with the set top box. Query 3 also includes a fingerprint FPB. However, Query 3 includes textual data that identifies the content from which the fingerprint originated as Media A. For example, Query 3 may also be received from a set top box that has incorrectly determined a channel being watched or that has incorrect guide data or metadata for video content being displayed. Query 4 includes a fingerprint FPC. Query 4 also includes textual data identifying the content as Media C. The textual data in Query 4 originates from metadata for the content from which the fingerprint was generated. Query 5 includes a fingerprint FPC and textual data identifying the content as Media C. The textual data in query 5 originates from metadata for the content from which the fingerprint was generated. Query 6 also includes a fingerprint FPC. Query 6, however, includes textual data identifying the content as Media D. The source of the textual data in Query 6 is metadata associated with the video content.

Each of the queries 382 is received at the media identification platform 302. The queries are initially passed to the cluster engine 322 for analysis of the fingerprints in each query. Cluster engine 322 performs a visual-based analysis of the fingerprints for example, and determines that the fingerprint in Query 2 matches the fingerprint in Query 3. Cluster engine 322 also determines that the fingerprint in Query 4 matches the fingerprint in Query 5 and the fingerprint in Query 6. Also, cluster engine 322 determines that Query 1 includes a fingerprint that does not match the fingerprints of any other queries. Based on the matching fingerprints, cluster engine 322 generates three query clusters 386. Cluster A includes Query 1, Cluster B includes Query 2 and Query 3, and Cluster C includes Query 4, Query 5, and Query 6.

After generating the query clusters 386, cluster engine 322 determines one or more representative fingerprints for each cluster. Cluster engine 322 then passes the representative fingerprint for each cluster to search engine 320. Search engine 320 compares the representative fingerprint 388 for each query cluster to the known fingerprints in catalog 310. In FIG. 3, search engine 320 determines that representative fingerprint RFPA for cluster A matches a known signature from catalog 310. In this example, the search engine determines that fingerprint RFPA matches a fingerprint 312 in catalog 310 having content identification information 314 IDA in FIG. 3. Accordingly, search engine 320 returns a reply to cluster engine 322 including CID information IDA identifying the representative fingerprint RFPA. Cluster engine 322 returns the CID information IDA for cluster A to web application 330 which generates a reply 384 to Query 1 including CID information IDA for the fingerprint FPA.

Search engine 320 also determines that there is no matching fingerprint 312 in catalog 310 for the representative fingerprint for Cluster B and Cluster C. Accordingly, search engine 320 returns a response to the cluster engine 322 indicating that there is no match for the representative fingerprint. In response to the no match reply from the search engine, consensus analyzer 324 analyzes the textual data associated with the queries of each cluster to determine if there is consensus amongst the queries that can be used to generate CID information for the queries of the cluster.

For Cluster B, analyzer 324 determines that Query 2 includes textual data identifying the video content as Media B, while Query 3 includes textual data identifying the content as Media C. In this instance, the cluster includes an equal number of queries identifying the fingerprints as being for different video content. Analyzer 324 applies weighting in this example to consider the metadata source of the textual data from Query 2 being more reliable that than the description source of the textual data from Query 3. Accordingly, analyzer generates CID information for Cluster B including or based on the textual data from Query 2. Thus, consensus analyzer 324 passes CID information of IDB to the cluster engine to identify the fingerprint as being for Media B.

For Cluster C, analyzer 324 determines that Query 4 includes textual data identifying the content as Media C, Query 5 includes textual data identifying the content as Media C, and Query 6 includes textual data identifying the content as Media D. In this case, the textual data for each query in Cluster C is from metadata associated with the video content from which each fingerprint FPC was generated. Analyzer 324 determines that there are two groups of queries in Cluster C. A first group including Query 4 and Query 5 identifies fingerprint FPC as being for Media C, while a second group including Query 6 identifies fingerprint FPC as being for Media D. Analyzer 324 determines that the number of queries identifying fingerprint FPC as being for Media C is greater than the number of queries identifying fingerprint FPC as being for Media D. Accordingly, analyzer 324 generates CID information IDC for Cluster C that identifies fingerprint FPC as corresponding to Media C. The content identification information for each cluster is used to generate replies to each query. In this case, Query Reply 4, Query Reply 5 and Query Reply 6 each include CID information IDC. It is noted that Query Reply 5 for Query 5 returns CID information IDC for Media C even though Query 5 included textual data identifying the content as being Media D.

FIG. 3 illustrates that the results of consensus analyzer 324 may be used to update catalog 310. In this example, update engine 326 receives the results from analyzer 324 to generate entries in catalog 310. Update engine 326 generates a new entry 390 based on Cluster B that includes the newly identified fingerprint FPB and the corresponding content identification information IDB. Similarly, update engine 326 generates a newly 392 based on Cluster C that includes the newly identified fingerprint FPC and the corresponding CID information IDC.

Figure 4:
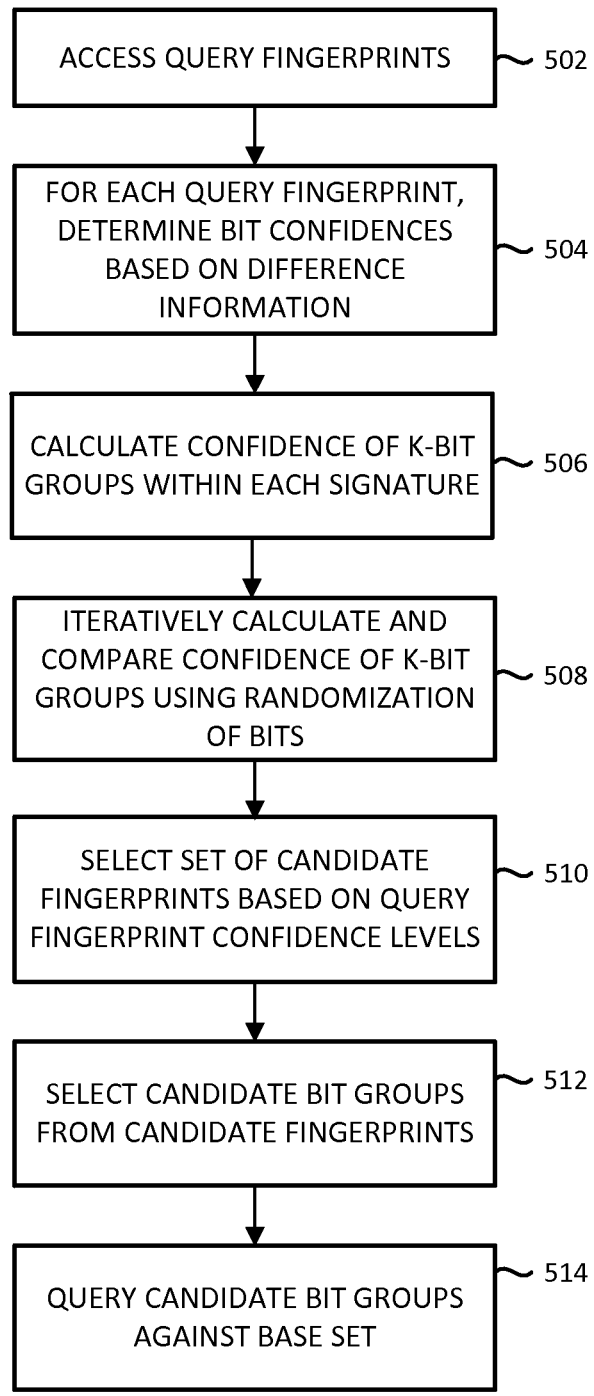
FIG. 4 is a flowchart describing a method in accordance with one embodiment for identifying or matching media queries.

FIG. 4 is a flowchart describing a method in accordance with one embodiment for identifying or matching a query video fingerprints. In one example, the method of FIG. 4 can be performed by cluster engine 322 to generate query clusters by comparing the fingerprints of a number of queries. In another example, the method of FIG. 4 can be performed by media search engine 320 to compare a query fingerprint with a base set of known fingerprints. It is noted that the process of FIG. 4 is presented by way of example only. Other processes for generating query clusters and comparing fingerprints to base sets of signatures may be used.

At step 502 the systems accesses the visual fingerprints for the selected query. The selected query may be a query being compared to a base set of known fingerprints and be selected by media search engine 320. The selected query may be a selected query by the cluster engine 322 being compared against other queries to generate query clusters. The query may include visual fingerprints generated for each frame of a video source. In one example, each visual fingerprint is a video frame signature.

At step 504 the system calculates a confidence for each bit in each query fingerprint based on difference information between the bits. At step 506, a confidence measure is calculated for a k-bit group or groups within each fingerprint. For example, a predetermined bit group from each frame can be selected. This may correspond to a predetermined area of interest such as the middle of a video screen or other area. The confidence measure at step 506 can be based on a total or a combination of the confidence measures of each bit within the bit group. At step 508 the system calculates confidence measure for each k-bit group using randomization of weaker and/or stronger bits. At step 510 a set of candidate fingerprint queries are selected based on the query confidence levels from step 508. For example, calculating a confidence of each k bit group of each fingerprint utilizing the randomization in step 510 can be used to select a small group of fingerprints from the fingerprints of the totality of frames to form the candidate group at step 512. At step 514 the candidate bit groups are queried against the catalog fingerprints or fingerprints of other queries.

FIG. 4 describes an example with respect to visual fingerprints but similar techniques may be used to compare audio signatures to known signatures or to other signatures in a set of queries for clustering. For example, audio fingerprints may include query-frames for an audio query. An audio stream may be divided by a system into consecutive temporal segments such as segments made of 4 seconds each (e.g., see section D below). Each of which can then be translated into an averaged spectrogram image.

Figure 5:
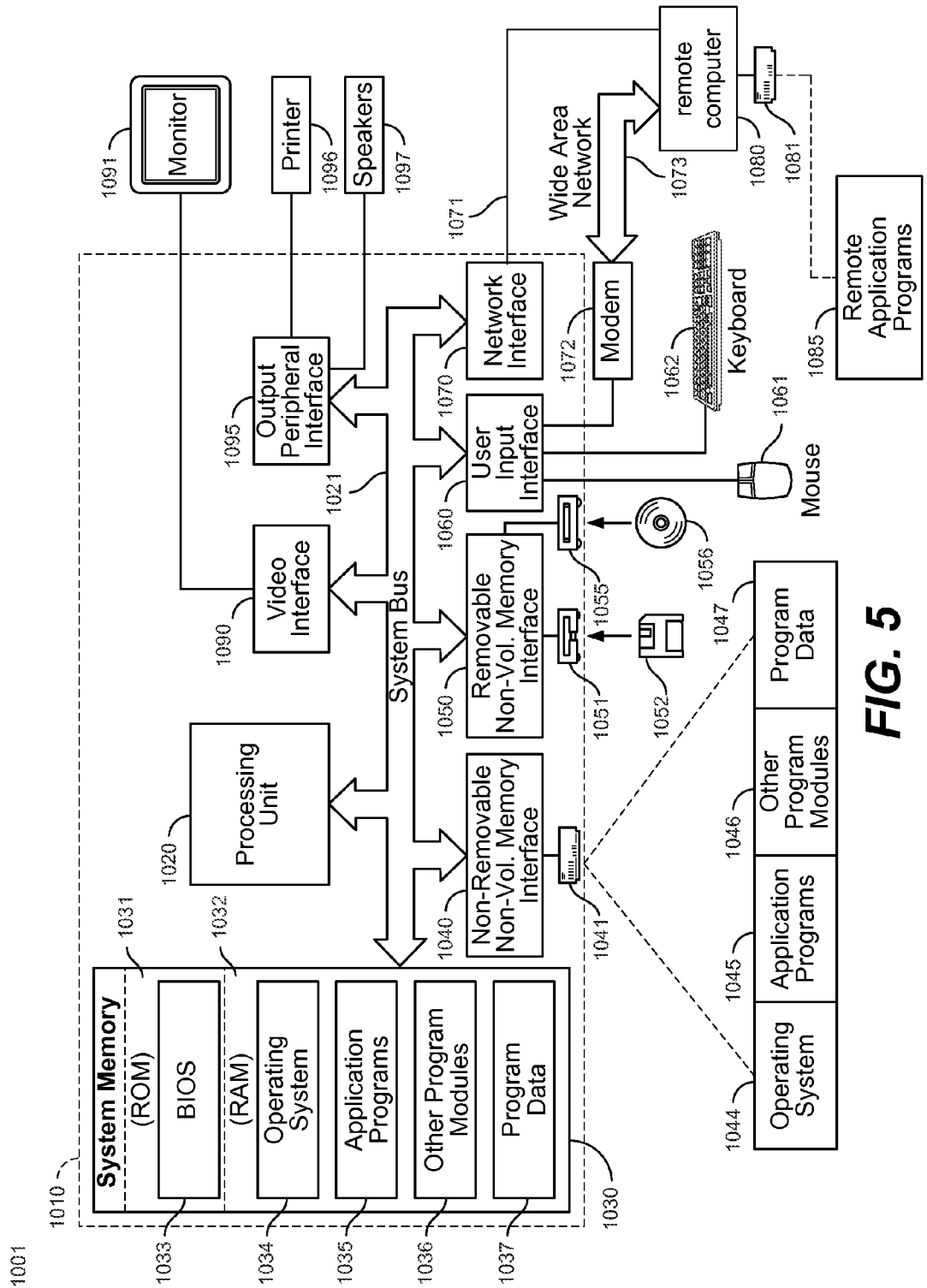
FIG. 5 is a block diagram of a computing environment in which embodiments of the disclosed technology may be implemented.

With reference to FIG. 5, an exemplary system for implementing the various components of the described system and method may include a general purpose computing device 1010. Computing device 1010 may be used to implement all or a portion of any one the components in FIG. 2. The computing device 1010 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system. In some embodiments the various depicted computing elements may include circuitry configured to instantiate specific aspects of the present disclosure. For example, the term circuitry used in the disclosure can include specialized hardware components configured to perform function(s) by firmware or switches.

In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 may include a variety of computer readable media. Computer readable media can be any available media that can be accessed by computer 1010 and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above provide storage of computer readable instructions, data structures, program modules and other data for the computer 1010. In FIG. 5 for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and a pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 5. The logical connections depicted in FIG. 5 include a local window network (LAN) 1071 and a wide window network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communication link between the computers may be used.

Figure 6:
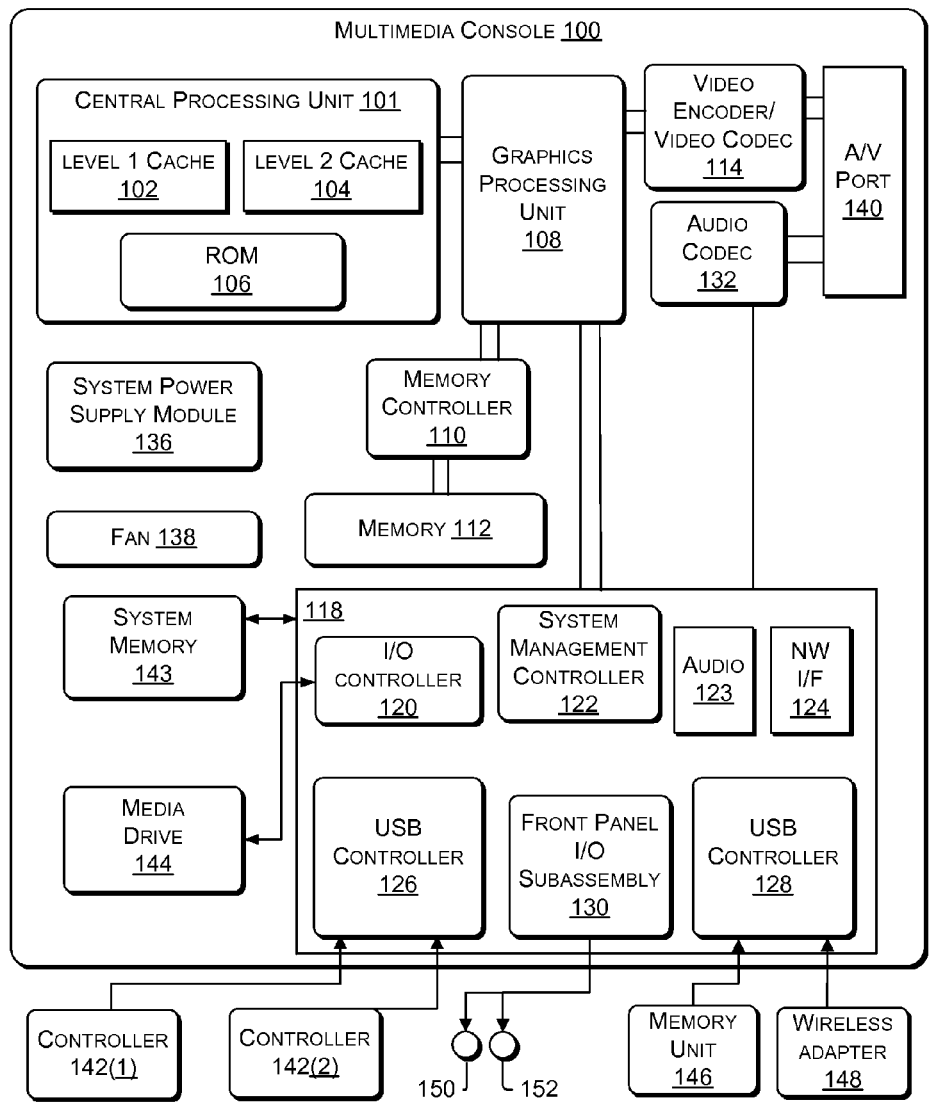
FIG. 6 is a block diagram of another computing environment in which embodiments of the disclosed technology may be implemented.

FIG. 6 depicts an example block diagram of another computing environment that may be used in the system of FIG. 2. In one example, the computing environment can be used for client devices 380. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from a depth camera system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A computer-readable storage medium having computer-executable instructions for programming a processor to perform a method, the method comprising:
  receiving from a plurality of client devices a plurality of queries for the identification of media content, each query including a media fingerprint;
  generating a plurality of query clusters based on comparisons of the media fingerprints of the plurality of queries, each query cluster including queries with one or more matching media fingerprints;
  for each query cluster, determining from at least a subset of queries in the query cluster textual data associated with the one or more matching media fingerprints;
  generating content identification information for each query cluster based on the textual data for the subset of queries; and
  generating a response to each query that includes the content identification information for a corresponding query cluster.

2. The computer-readable storage medium of claim 1, wherein generating content identification information for each query includes for a first query cluster:
  determining that a first group of queries in the first query cluster includes first textual data corresponding to first media content;
  determining that a second group of queries in the first query cluster includes second textual data corresponding to second media content;
  comparing a number of queries in the first group with a number of queries in the second group; and
  generating the content identification information based on comparing the number of queries in the first group to the number of queries in the second group.

3. The computer-readable storage medium of claim 2, wherein:
  the number of queries in the first group is greater than the number of queries in the second group;

generating the content identification information includes generating content identification information based on the first textual data; and generating a response to each query includes generating a response to each query in the second group including content identification information based on the first textual data corresponding to the first media content.

4. The computer-readable storage medium of claim 2, wherein generating content identification information for each query in the first query cluster includes:

applying a first weighting to the first textual data based on a source of the first textual data for each query in the first group; and applying a second weighting to the second textual data based on a source of the second textual data for each query in the second group;

wherein comparing the number of queries in the first group with the number of queries in the second group includes applying the first weighting to the first number of queries and applying the second weighting to the second number of queries.

5. The computer-readable storage medium of claim 1, wherein the method further comprises:

generating the media fingerprint for each query from unidentified video content.

6. The computer-readable storage medium of claim 5, wherein:

at least a portion of the queries include a plurality of visual fingerprints for a plurality of frames of the unidentified video content, the visual fingerprint for each frame including a bit representation of brightness for a predetermined number of cells of the corresponding frame.

7. The computer-readable storage medium of claim 1, wherein the method further comprises:

tracking queries from the plurality of clients to determine for each client a reliability rating based on past matching of textual data from queries matching the content identification information for corresponding query clusters.

8. The computer-readable storage medium of claim 7, wherein the method further comprises:

determining whether the reliability rating for each user is above a threshold reliability rating; and generating for a catalog of known fingerprints, content identification information for unknown video content based on textual data and visual fingerprints from one or more clients having a reliability rating above the threshold reliability rating.

9. The computer-readable storage medium of claim 8, wherein the method further comprises:

streaming fingerprints and textual data from the one or more clients to a search service in response to determining that the reliability rating of the one or more clients is above the threshold reliability rating.

10. A computer-implemented method of automated content recognition, comprising:

receiving from a plurality of clients a plurality of queries for the identification of media content, each query including a media fingerprint;

generating from the plurality of queries query clusters based on comparisons of the media fingerprints of the plurality of queries;

comparing the media fingerprint of at least one query from each query cluster to a base set of known media fingerprints;

returning content identification information from the base set for each query cluster in which the at least one query matches a known media fingerprint of the base set; and for each query cluster in which the at least one query does not match a known media fingerprint, determining textual data associated with the media fingerprint from at least a subset of queries of the query cluster, generating content identification information based on the textual data for the subset of queries of the query cluster, and generating a response to each query of the cluster, the response including the generated content identification information for the query cluster.

11. The computer-implemented method of claim 10, further comprising for each query cluster in which the at least one query does not match a known media fingerprint:

generating one or more entries in the base set of known media fingerprints, the one or more entries including one or more media fingerprints from the query cluster and the generated content identification information.

12. The computer-implemented method of claim 11, wherein:

a first query cluster in which the at least one query does not match a known media fingerprint includes textual data comprising metadata associated with a first query and textual data comprising a filename associated with a second query; and generating the content identification information includes applying a first weighting to the metadata and a second weighting to the filename.

13. The computer-implemented method of claim 12, further comprising for the first query cluster:

comparing the textual data associated with the subset of queries to determine if there is consensus of identification information for the first query cluster, wherein the textual data is compared using the first weighting and the second weighting.

14. The computer-implemented method of claim 13, wherein the media fingerprint of each query is a visual fingerprint corresponding to unidentified video content.

15. The computer-implemented method of claim 13, wherein the media fingerprint of each query is an audio fingerprint corresponding to unidentified audio content.

16. The computer-implemented method of claim 13, wherein the media fingerprint of each query is an audio fingerprint corresponding to unidentified video content.

17. A computing device, comprising:

one or more storage devices comprising processor readable code and a catalog including media fingerprints and content identification information for media content; and one or more processors in communication with the one or more storage devices, the one or more processors execute the processor readable code to:

receive from a plurality of clients over one or more networks a plurality of queries for the identification of media content, each query includes a media fingerprint corresponding to the media content, generate a plurality of query clusters, each query cluster including queries of the plurality that have a matching media fingerprint, determine whether one or more media fingerprints from each query cluster matches a media fingerprint from the catalog, for each query cluster that matches a media fingerprint from the catalog, generate content identification information for each query of the query cluster based on corresponding content identification information from the catalog, and for each query cluster that does match a media fingerprint from the catalog, generate content identification information for each query of the query cluster based on textual data associated with at least a subset of queries from the query cluster.

18. The computing device of claim 17, wherein for a first query cluster that does not match a media fingerprint from the catalog, the one or more processors:

determine that a first group of queries in the first query cluster includes first textual data corresponding to first video content;

determine that a second group of queries in the first query cluster includes second textual data corresponding to second video content;

compare a number of queries in the first group with a number of queries in the second group; and generate the content identification information based on comparing the number of queries in the first group to the number of queries in the second group.

19. The computing device of claim 17, wherein the one or more processors:

apply a first weighting to the first textual data based on a source of the first textual data for each query in the first group;

apply a second weighting to the second textual data based on a source of the second textual data for each query in the second group; and compare the number of queries in the first group with the number of queries in the second group by applying the first weighting to the first number of queries and applying the second weighting to the second number of queries.

20. The computing device of claim 18, wherein:

the plurality of queries are visual identification queries; and the media fingerprint of each query includes a visual fingerprint.

* * * * *